US008159952B2

(12) United States Patent
Ansari et al.

(10) Patent No.: US 8,159,952 B2
(45) Date of Patent: Apr. 17, 2012

(54) DATA PACKET TRAFFIC SCHEDULING

(75) Inventors: Nirwan Ansari, Montville, NJ (US);
Ehsan Haghani, Kearny, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 553 days.

(21) Appl. No.: 12/368,516

(22) Filed: Feb. 10, 2009

(65) Prior Publication Data

US 2010/0202415 A1 Aug. 12, 2010

(51) Int. Cl.
*H04W 4/00* (2009.01)
(52) U.S. Cl. ......... 370/235; 370/252; 370/329; 370/341
(58) Field of Classification Search ....................... None
See application file for complete search history.

(56) References Cited

U.S. PATENT DOCUMENTS

| 6,996,626 | B1 * | 2/2006 | Smith | 709/232 |
|---|---|---|---|---|
| 7,248,564 | B1 * | 7/2007 | Grosdidier et al. | 370/235 |
| 2008/0253325 | A1 * | 10/2008 | Park et al. | 370/329 |
| 2009/0003282 | A1 * | 1/2009 | Meylan et al. | 370/331 |

OTHER PUBLICATIONS

W. Jiang and H. Schulzrinne, "Analysis of on-off patterns in VoIP and their effect on voice traffic aggregation," in Proceedings Ninth International Conference on Computer Communications and Networks, Oct. 2000, pp. 82-87.
E. Haghani, S. DE and N. Ansari, "On modeling VoIP traffic in broadband networks," in IEEE Global Telecommunications Conference(Globecom '07), Nov. 2007.
D. Bonfiglio, M. Mellia, M. Meo, D Rossi, and P. Tofanelli, Revealingskype traffic: when rendamoness plays with you in Proceedings ACM SIGCOMM 2007, Aug. 2007.
H. Lee, T Kwon, and D.H. Cho, "An enhanced uplink scheduling algorithm based on voice activity for VoIP sevices in IEEE 802.16d/e system." IEEE Communication Letters, vol. 9. pp. 44-51, Aug. 2005.
G. Yanfeng and H. Aiqun, "Bandwidth allocation algorithm of VoIP based on the adaptive linear prediction in the IEEE 802.16 system." in Jun. 2006, pp. 16-19.
D. Zhao and X. Shen, "Performance of packet voice transmission using IEEE 802.16 protocol, "IEEE Wireless Communications, vol. 14, pp. 44-51, Feb. 2007.
N. Scalabrino, F.D. Pellegrini, R. Riggio, A Maestrini, C. Costa and I. Chlamtac, "Measuring the quality of VoIP traffic on a WiMAX testbed." in Proceedings TRIDENTCOM May 2007.
H. Toral-Cruz and D. Torres-Roman, "Traffic analysis for IP telephony," in Proceeding 2nd International Conference on Electrical and Electronics Engineering, Sep. 2005, pp. 136-139.
A. Sukhov, P. Calyam, W. Daly and A. Illin, "Towards an analytical model for characterizing behavior of high-speed VVoIP applications," in TERENA Networking Conference (TNC), Jun. 2005.
Haghani, Ehsan and Ansari, Nirwan, "VoIP Traffic Scheduling in VViMax Networks" AdvancedNetworking Lab, Department of Electrical and Computer Engineering, New Jersey Institute of Technology, Newark, NJ 07102, Nov. 2008 USA.

* cited by examiner

*Primary Examiner* — Chi H. Pham
*Assistant Examiner* — Shick Hom
(74) *Attorney, Agent, or Firm* — Baker & Hostetler LLP

(57) ABSTRACT

Techniques of scheduling data packets are disclosed. For example, such data packet scheduling techniques may be employed to schedule data packets on wired and/or wireless networks. An example embodiment includes techniques for scheduling voice-over-Internet protocol data packets transmitted between a base station and a subscriber station on a WiMAX network.

22 Claims, 13 Drawing Sheets

$g$ = *generation time of the last packet*
$t$ = *current time*
$d \leftarrow (t - g)$
*if* $d \leq \Delta_N$
    $index \leftarrow \arg \min_i (\Delta_i - d \geq 0)$
*else*
    $index \leftarrow (N + 1)$
*end*
*send index to BS*

```
index = last requested index
t = last allocation time
if index ≤ N
    if ρ ≤ 1 − $C_N$
        i ← N
    else
        i ← arg $\min_i$ (ρ ≥ 1 − $c_i$)
    end
    k = max(index, i)
    allocate BW equal to S at least $\Delta_k$ from t
else
    allocate BW equal to S as soon as possible
end
t ← allocated time
put allocated time in UL MAP
```

| WiMAX Parameters | Value |
|---|---|
| MAC frame length | 5ms, 10ms |
| Bits per timeslot | 192 |
| Duplexing | TDD |
| Channel bandwidth | 5 MHz |
| Uplink modulation | 16 QAM |
| Uplink control slots | 4 timeslots |
| Uplink data symbols 5ms | 21 |
| Uplink data symbols 10ms | 45 |

FIG. 7

```
┌─────────────────────────────────────────────────────────────────────┐
│ collecting a plurality of inter-packet times for data transmitted   │
│ from the subscriber station to the base station                     │
└─────────────────────────────────────────────────────────────────────┘
                                                              ↘ 201
┌─────────────────────────────────────────────────────────────────────┐
│ creating an inter-packet time matrix, Δ, including the plurality of │
│ inter-packet times $\Delta_i$, where $i$ is an integer between 1 and $N$      │
└─────────────────────────────────────────────────────────────────────┘
                                    ↓                         ↘ 202
┌─────────────────────────────────────────────────────────────────────┐
│ creating a probability matrix, P, including a value $p_i$ of a        │
│ probability mass function for two or more $\Delta_i$                     │
└─────────────────────────────────────────────────────────────────────┘
                                    ↓                         ↘ 204
┌─────────────────────────────────────────────────────────────────────┐
│ transmitting Δ, P, and a nominal data packet size to the base station│
└─────────────────────────────────────────────────────────────────────┘
                                    ↓                         ↘ 206
┌─────────────────────────────────────────────────────────────────────┐
│ calculating a time difference, d, equal to a difference between a   │
│ current time and a time when a previous data packet was generated   │
└─────────────────────────────────────────────────────────────────────┘
                                    ↓                         ↘ 208
┌─────────────────────────────────────────────────────────────────────┐
│ if d is less than or equal to $\Delta_N$, setting an *index* parameter   │
│ equal to an $i$ associated with a smallest $\Delta_i$ which is equal to or │
│ greater than d, otherwise setting the *index* parameter equal to N+1│
└─────────────────────────────────────────────────────────────────────┘
                                    ↓                         ↘ 210
┌─────────────────────────────────────────────────────────────────────┐
│ transmitting the *index* parameter to the base station              │
└─────────────────────────────────────────────────────────────────────┘
                                                              ↘ 212
┌─────────────────────────────────────────────────────────────────────┐
│ transmitting one or more packets of data between the subscriber     │
│ station and the network using the allocated bandwidth, wherein the  │
│ allocated bandwidth is associated with one or more of Δ, P, and the │
│ *index* parameter                                                   │
└─────────────────────────────────────────────────────────────────────┘
                                                              ↘ 213
```

FIG. 11

DATA PACKET TRAFFIC SCHEDULING

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. 0726549 awarded by the National Science Foundation.

BACKGROUND

Voice-over-Internet protocol ("VoIP") refers the transmission of voice data over a data network using the Internet protocol. For example, VoIP data may be transmitted via a wireless network, such as a WiMAX ("Worldwide Interoperability for Microwave Access") network. WiMAX is based on the IEEE (Institute of Electrical and Electronics Engineers) standard 802.16-2001 and IEEE standard 802.16-2004, which may also be referred to as a Wireless Metropolitan Area Network (or WirelessMAN). WiMAX networks may typically be connected to the Internet, thereby providing wireless broadband Internet access to users.

BRIEF SUMMARY

One or more embodiments described herein may include systems and/or methods of scheduling voice-over-Internet protocol data packets on wireless broadband networks, such as WiMAX networks. Some example methods may include a request and a grant, where the request can be transmitted from a subscriber station to a base station. The request may include an index parameter corresponding to an inter-packet time. The request may be processed by the base station and/or the grant may be transmitted back to the requesting subscriber station. The grant may include a bandwidth allocation based at least in part on one or more of the received index parameter and an availability factor.

The Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 5 depicts an example request algorithm;

FIG. 6 depicts an example grant algorithm;

FIG. 7 lists example WiMAX parameters used in a simulation;

FIG. 11 is a flowchart showing the operation of an example embodiment;

DETAILED DESCRIPTION

Figure 1:
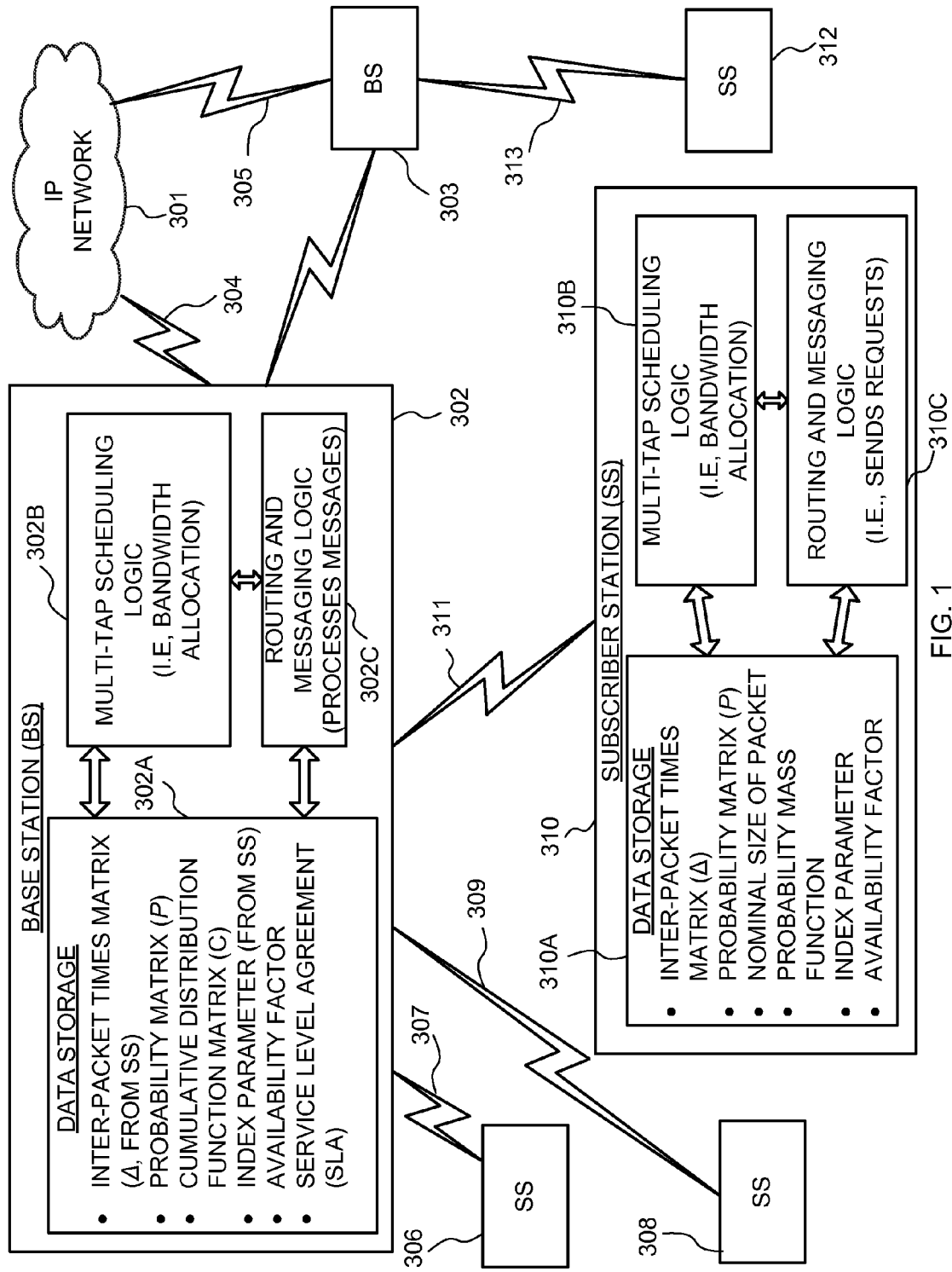
FIG. 1 is a schematic diagram of an example network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to scheduling transmission of data packets on networks such as WiMAX networks and other wireless networks.

An example network 300 is depicted in FIG. 1. A base station 302 in communication with an IP network 301 via a connection 304 is also in communication with a plurality of subscriber stations 306, 308, 310 via at least one network that may include connections 307, 309, 311. Another base station 303, also in communication with the IP network 301 via a connection 305, is in communication with a subscriber station 312 via a network that may include connection 313. Base station 302 includes data storage 302A, multi-tap scheduling logic 302B, and routing and messaging logic 302C. Subscriber station 310 includes data storage 310A, multi-tap scheduling logic 310B, and routing and messaging logic 310C.

In the example network depicted in FIG. 1, the base stations 302, 303 are operative to transmit data between the IP network 301 and the subscriber stations 306, 308, 310, 312 and are operative to transmit data between the subscriber stations 306, 308, 310, 312 and the IP network 301 via the connections 304, 305. Referring specifically to the example base station 302 and the example subscriber station 310, the multi-tap scheduling logic 310B is operative to calculate an inter-packet time matrix, a probability matrix, and a nominal packet size, and to store these parameters in data storage 310A. The subscriber station 310 transmits the inter-packet time matrix, the probability matrix, and the nominal packet size to the base station 310. In addition, the multi-tap scheduling logic 310B estimates when the subscriber station 310 will be ready to transmit a subsequent packet and transmits this information in the form of a request to the base station 302 via the routing the messaging logic 310C. The base station 302 is operative to receive (via the routing and messaging logic 302C) the inter-packet time matrix, the probability matrix, and the nominal packet size from the subscriber station 310, and to store this information in data storage 302A. In addition, the base station 302 receives the request from the subscriber station 310 (via the routing and messaging logic 302C). The multi-tap scheduling logic 302B calculates an availability factor and, using the request, generates a grant that allocates bandwidth for use by the subscriber station 310. The subscriber station 310 transmits data to the IP network 301 via the base station 302 using the allocated bandwidth.

In some embodiments, the connections 307, 309, 311 between the base station 302 and the subscriber stations 306, 308, 310, 312 may be wireless and/or wired. In some embodiments, a base station 302 may be in communication with at least one other base station 303 via a wireless and/or a wired connection. In example embodiments, the base stations may be arranged in a cellular architecture such that individual cells may form a separate IP network and such that individual base stations may be connected to the IP network 301 (such as the internet).

Figure 2:
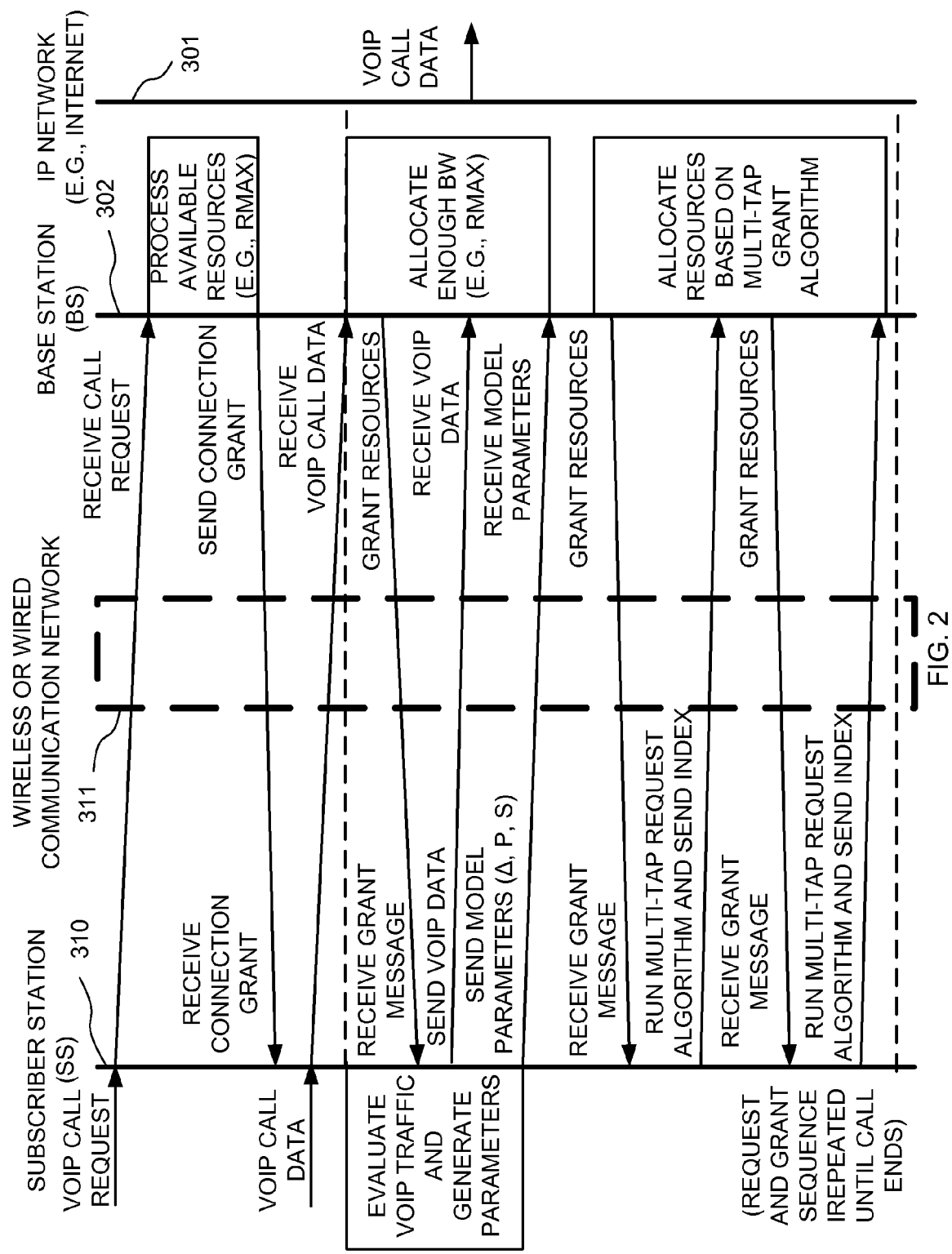
FIG. 2 is a signal flow diagram for an illustrative embodiment.

FIG. 2 is a signal flow diagram for an illustrative embodiment. As shown, a wired or wireless communications network 311 interposes a SS 310 and a BS 302. In example embodiments, is the BS 302 may be operatively connected to an IP network 301, such as the internet.

As shown in FIG. 2, the illustrative embodiment operates as follows. A VoIP call request may be transmitted by the SS 310 to the BS 302. The BS 302 may process available resources and sends a connection grant, which may be received by the SS 310. The SS 310 may begin sending VoIP call data, which may be received by the BS 302. The BS 302 may allocate bandwidth ("BW"), thereby granting resources to the SS 310. The SS 310 may evaluate the VoIP traffic and may generate parameters (such as an inter-packet time matrix, a probability matrix, and a nominal packet size, which it transmits to the BS 302. The BS 302 may use these parameters to allocate BW resources using a multi-tap grant algorithm. The SS 310 may receive the grant message and may run a multi-tap request algorithm. The SS 310 may send an index parameter, which may be used by the BS 302 to allocate future BW resources to the SS 310. The request and grant sequence may be repeated for the duration of the VoIP call.

In accordance with the present disclosure, WiMAX is a promising technology for broadband wireless access. To date, demand for providing mobile users with broadband wireless access has attracted tremendous investment from the telecommunications industry in the development and deployment of WiMAX networks. In accordance with the present disclosure, VoIP over WiMAX may be a significant application that may drives rapid deployment of WiMAX networks. The desire to bundle voice and data may increase the portion of voice traffic in WiMAX networks. Hence, in accordance with the present disclosure, VoIP, as a technology for making voice calls through packet switched networks, may be utilized as an application in WiMAX networks.

In accordance with the present disclosure, the popularity of VoIP applications (such as Skype®, Google Talk, MSN Messenger, and Yahoo Messenger) along with emerging deployment of WiMAX networks is making VoIP over WiMAX an attractive market for both carriers and equipment suppliers, though challenges remain. Improvement of the VoIP call capacity over WiMAX networks is one challenge. While many scheduling methods have not considered the traffic characteristics of VoIP, this disclosure describes an example traffic-aware scheduling algorithm for VoIP applications in WiMAX networks, discusses the tradeoff between delay and bandwidth efficiency, and provides data showing that the example scheduling systems and methods may enhance the efficiency of VoIP over WiMAX.

In accordance with the present disclosure, efficient resource management may be utilized due to the scarcity of available bandwidth in wireless networks. The IEEE 802.16 standard defines different scheduling services and quality of service ("QoS") mechanisms for WiMAX, but the details of traffic scheduling are intentionally left open for vendors' innovation to design scheduling methods suitable for their networks.

The present disclosure contemplates that to design a scheduling algorithm, it may be beneficial to understand the traffic features and service requirements of the different applications consuming network resources. An imprecise model of the traffic may lead to wasted bandwidth and lower efficiency.

The present disclosure contemplates that one VoIP traffic model is referred to as the ON-OFF model, as discussed in H. Heffes and D. Lucantoni, "A markov modulated characterization of packetized voice and data traffic and related statistical multiplexer performance," IEEE J. Select. Areas Commun., vol. 4, no. 6, pp. 856-68, September 1986, which is incorporated by reference. In the ON-OFF model, it is assumed that the source generates equal-size packets separated equally in time during the ON period and either does not generate any packets or generates smaller packets during the OFF period. The present disclosure contemplates that, although natural voice may conform to the ON-OFF model, experimental traces of VoIP packets, incorporating the impact of the application codes, transport layer, and IP layer, typically do not exhibit the characteristics of an ON-OFF traffic as discussed in E. Haghani, S. De, and N. Ansari, "On modeling VoIP traffic in broadband networks," in Proc. IEEE Global Telecommunications Conference (Globecom'07), Washington DC, November 2007, pp. 1922-1926; D. Bonfiglio, M. Mellia, M. Meo, D. Rossi, and P. Tofanelli, "Revealing skype traffic: when randomness plays with you," in Proceedings ACM SIGCOMM 2007, August 2007; and M. Menth, A. Binzenhfer, and S. Muhleck, "Source models for speech traffic revisited," University of Wuzburg, Germany, Tech. Rep. 426, May 2007, which are incorporated by reference.

While the importance of efficient resource management has prompted a keen interest in the research community on scheduling VoIP traffic in WiMAX networks, the present disclosure contemplates that much of the research has assumed that the packet generation process can be modeled by the ON-OFF model. See H. Lee, T. Kwon, and D. H. Cho, "An enhanced uplink scheduling algorithm based on voice activity for VoIP services in IEEE 802.16d/e system," IEEE Communications Letters, vol. 9, pp. 44-51, 2005, which proposes a scheduling method based on the ON-OFF model; G. Yanfeng and H. Aiqun, "Bandwidth allocation algorithm of VoIP based on the adaptive linear prediction in the IEEE 802.16 system," in Proceedings of 6th International Conference on ITS Telecommunications, June 2006, pp. 16-19 which uses the ON-OFF model to perform a predictive scheduling of VoIP traffic in IEEE 802.16 systems; D. Zhao and X. Shen, "Performance of packet voice transmission using IEEE 802.16 protocol," IEEE Wireless Communications, vol. 14, pp. 44-51, 2007, which presents an analysis of the voice packet transmission in IEEE 802.16; and N. Scalabrino, F. D.

Pellegrini, R. Riggio, A. Maestrini, C. Costa, and I. Chlamtac, "Measuring the quality of VoIP traffic on a WiMAX testbed," in Proceedings TRIDENTCOM 2007, May 2007, which includes a qualitative experimental study of VoIP traffic in a WiMAX testbed, all of which are incorporated by reference.

An example "multi-tap" VoIP traffic model described herein can be applied to different VoIP applications, and the present disclosure contemplates that experimental reports of the VoIP traffic generated with different applications (such as Skype®, Google Talk, MSN Messenger, and Yahoo Messenger) may conform to this model as discussed in H. Toral-Cruz and D. Torres-Roman, "Traffic analysis for IP telephony," in Proceeding 2nd International Conference on Electrical and Electronics Engineering, September 2005, pp. 136-139, and A. Sukhov, P. Calyam, W. Daly, and A. Illin, "Towards an analytical model for characterizing behavior of high-speed VVoIP applications," in TERENA Networking Conference (TNC), June 2005, which are incorporated by reference. Based at least in part on realistic and experimental traffic traces, the multi-tap traffic model may include two features of the traffic: packet size and inter-packet time.

In an example multi-tap model, the size of packets may be almost constant during the duration of conversation. The multi-tap model may utilize a probability mass function ("PMF") for the inter-packet times. In essence, the multi-tap model may assign the values of a discrete-time random variable to inter-packet times.

In accordance with the present disclosure, it is recognized that the parameters of the multi-tap model may be measured in a short period of time, such as one second. Such a short period of time may allow the a device to quickly derive a new set of parameters if parameters change. For example, an IP address or network parameter may change during a voice connection. However, such changes may occur rarely during a conversation with duration of only a few minutes.

Figure 3:
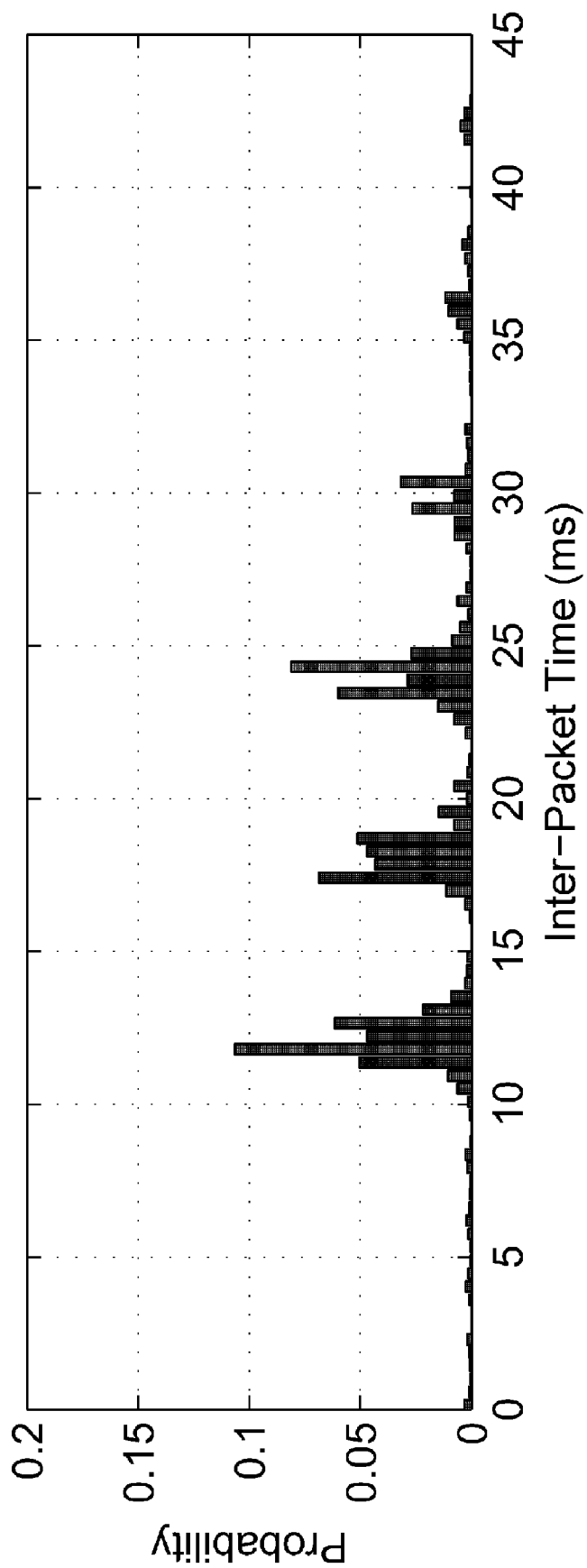
FIG. 3 is a plot of an example distribution of inter-packet time showing a real distribution from a trace.
Figure 4:
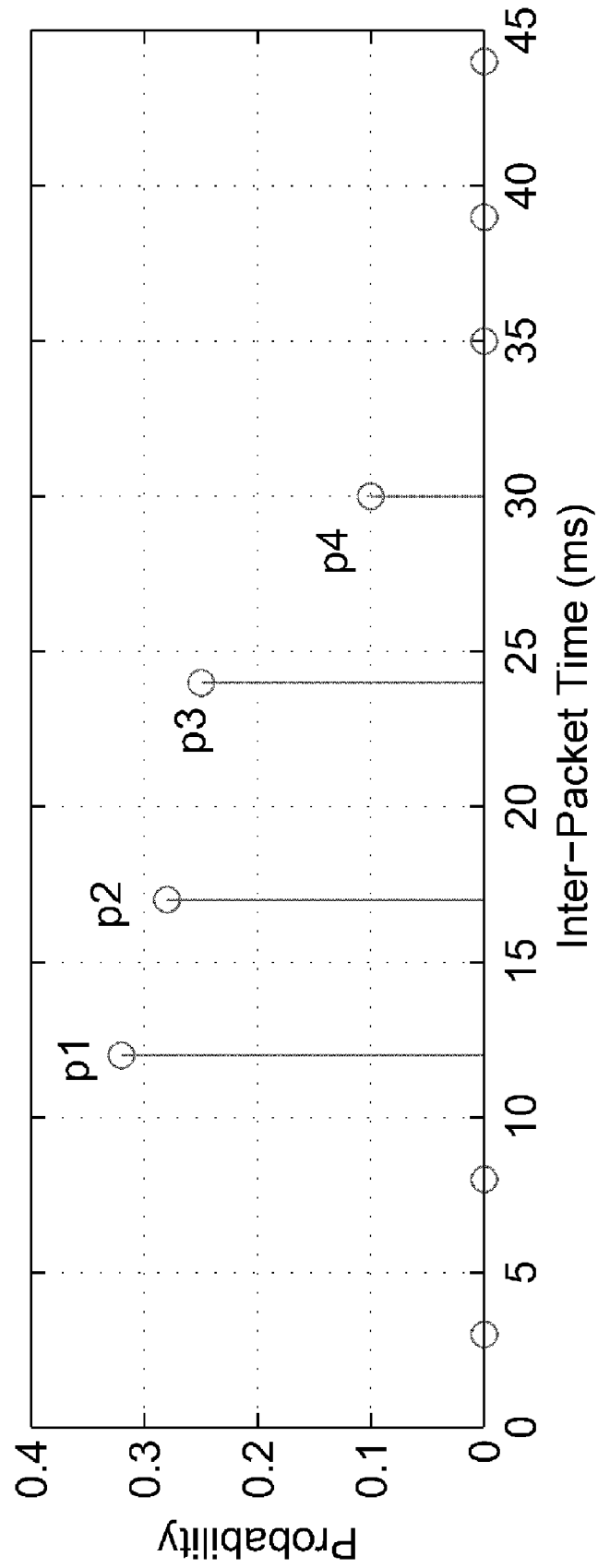
FIG. 4 is a plot of an example distribution of inter-packet time for a distribution produced by a model.

An experimental traffic trace is shown in FIG. 3 and a corresponding traffic model is shown in FIG. 4. The distribution of the inter-packet time of uplink packets can be written as equation (1).

$$P_\Delta(\Delta) = \sum_{i=1}^{N} p_i \tag{1}$$

In Equation (1), $P_\Delta(\Delta)$ is the PMF of the inter-packet time and the distinct values $p_i$ may be referred to as a "tap." An individual tap may indicate the probability of having an inter-packet time equal to $\Delta$, or $$p_i = Pr\{\Delta = \Delta_i\}$$

The distribution of inter-packet time for any VoIP connection can be modeled with two matrices. First, the inter-packet time matrix A, which may be 1×N, for example, shows the locations of taps: $\Delta=[\Delta_1, \Delta_2, \ldots, \Delta_N]$. In this example, an individual tap may be one of the inter-packet times in the inter-packet time matrix. Second, the probability matrix P, which may be 1×N, for example, may show the value of PMF for taps: $P=[p_1, p_2, \ldots, p_N]$N may represent the number of taps. For a particular VoIP connection, the parameter N may be constant, while different calls (e.g., different VoIP connections) may have different numbers of taps. As mentioned before, the size of the packets, S, also may be constant in this model. Therefore, one can understand the parameters of the multi-tap traffic model by studying (P, $\Delta$, S).

As an example, for a voice call trace and its model shown in FIGS. 3 and 4, respectively, the parameters of the traffic model are N=4, $\Delta$=[12,17, 24, 30] (ms), and P=[0.32, 0.28, 0.25, 0.10]. Based at least in part on the PMF, the cumulative distribution function ("CDF") of the inter-packet time can be described by the following matrix C.

$$C = [C_1, C_2, \ldots, C_N] \tag{2}$$

$$C_j = Pr\{\Delta < \Delta_j\} = \sum_{i=1}^{j-1} p_i$$

In accordance with the present disclosure, in some examples, WiMAX networks may be designed to support different types of traffic, such as VoIP data, email data, World Wide Web data, etc. While the network may be designed to work as the backhaul for broadband communications, it may be tailored to provide wireless access to mobile users. Supporting various types of traffic may involve flexibility in design and functionality. Owing to this demand, there are many available options in the IEEE 802.16 standard that are supposed to be chosen by vendors based at least in part on their network requirements.

Traffic scheduling is one of the issues that fall outside the scope of the IEEE 802.16 standard. In some examples, it is up to vendors to make the best decision based at least in part on their network traffic, although IEEE 802.16 defines different types of scheduling services for various types of traffic.

The present disclosure contemplates that VoIP traffic may be real-time and delay sensitive, and it typically may be appropriate to allocate network resources to VoIP traffic within a limited period of time. One of the scheduling points in IEEE 802.16 is the scheduling of the Up Link ("UL") subframe by the base station ("BS"). To schedule the UL subframe, the BS may receive requests from subscriber stations ("SSs") and, after processing the requests, the BS may create the UL MAP message of the next UL subframe and distributes it to SSs. After receiving the UL MAP message, an individual SS may know the time and amount of bandwidth reserved for its very next UL subframe. This process may utilize bandwidth negotiations between the BS and one or more SS. Based at least in part on the type of traffic and policy of the network, different approaches to perform the bandwidth request and grant may be possible.

The present disclosure considers that there may be three types of scheduling services defined by IEEE 802.16 that may be capable of supporting real-time traffic (such as VoIP). They may include unsolicited grant service ("UGS"), real-time polling service ("rtPS"), and/or extended real-time polling service ("ertPS"). In UGS, the BS may periodically allocate a fixed amount of bandwidth resources to the subscriber station and the SS may not need to send a bandwidth request. In the rtPS, the BS may periodically poll the SS for its uplink bandwidth request, and the BS may allocate bandwidth to the SS in the next uplink subframe. The ertPS basically works similarly to UGS, but the SS may have the opportunity to request that the BS allocate a different amount of bandwidth whenever the SS wishes to change the transmission rate.

The present disclosure contemplates that, in some circumstances, UGS may have the best delay performance, but the allocated bandwidth may be "wasted" when the user does not have enough traffic to transmit in a UL subframe. As mentioned above, in some cases, VoIP packets may be small and the associated bitrate may be low. Thus, the wasted bandwidth problem most likely may be experienced by users generating only VoIP traffic.

The present disclosure contemplate that, in some circumstances, the rtPS scheduling method may provide better bandwidth efficiency than UGS because a SS requests bandwidth ("BW") based at least in part on its queue. However, the BW polling procedure may itself involve some BW allocation. Moreover, in the rtPS method, packets may encounter a deterministic delay proportional to the frame length. Therefore, the delay performance of the network may be degraded when rtPS is utilized.

The present disclosure contemplates that the ertPS scheduling method may have issues similar to UGS and rtPS. In consideration of the issues encountered by these three scheduling services, it appears that in order to reduce the delay for the UL packets at the SS, the BS may allocate BW to users more frequently. This may increase the bandwidth loss, and thus decrease the BW efficiency. Thus, there may be a tradeoff between the delay performance and bandwidth efficiency in these scheduling methods.

The present disclosure contemplates that providing users with a high quality voice connection without wasting valuable and limited bandwidth may be desirable for service providers. Therefore, it may be advantageous for service providers to choose a scheduler to enhance the performance of their networks. A scheduling method based at least in part on the multi-tap traffic model discussed above, referred to as multi-tap scheduling, may use the information of the multi-tap traffic model to perform efficient scheduling.

In accordance with the presently described multi-tap scheduling methods, it may be assumed that the SS has captured the characteristics of the VoIP traffic, and thus knows the parameters of the VoIP traffic model discussed above (e.g., the inter-packet time matrix, $\Delta_{1 \times N}$, and the probability matrix, $P_{1 \times N}$). In an example embodiment, the SS may capture the characteristics of the VoIP call by running a packet sniffer program that provides the inter-packet times and the size of packets. In an embodiment, the SS may capture the traffic for a few seconds (for example, 5-10 sec) after the beginning of the VoIP call to assess these parameters. The SS may calculate the PMF of inter-packet times. Thus, in this example embodiment, the parameters may be sensed by the SS after the call has begun and they may be piggybacked in a message sent to the BS after the parameters are measured and calculated by the SS.

By assuming that the SS knows the PMF of its VoIP traffic and the nominal size of the packets, S, the average inter-packet time, $\overline{\Delta}$, can be calculated using Equation (3).

$$\overline{\Delta} = \sum_{i=1}^{N} P_i \cdot \Delta_i \tag{3}$$

$R_{avg}$ may be defined as the average bitrate that may be utilized by the SS to transmit its VoIP packets to the BS and $R_{max}$ as the maximum bitrate the BS can allocate to SS. $R_{max}$ may determined by the service level agreement ("SLA") (a contract between a service provider and a service customer that specifies certain characteristics of the service, such as a maximum bitrate), as well as the status of the network, for example. In order to keep the delay bounded, it may be appropriate to have $R_{avg} \leq R_{max}$. Otherwise, the voice call may not be able to be admitted into the network. $R_{avg}$ may be calculated using Equation (4).

$$R_{avg} = \frac{S}{\overline{\Delta}} \text{ (bps)} \tag{4}$$

Another parameter used in the example multi-tap scheduling algorithm may be the availability factor, $\rho$. This parameter may indicate the availability of bandwidth for the VoIP traffic. The larger the parameter, the higher the bitrate the BS can allocate to the VoIP traffic. $\rho$ may be calculated from $R_{avg}$ and $R_{max}$ using Equation (5).

$$\rho = 1 - \frac{R_{avg}}{R_{max}} \tag{5}$$

In the example multi-tap scheduling method, the SS may predict the generation time of the next packet whenever it gets the opportunity to transmit to the BS. The SS may use the matrix $\Delta$ for this prediction. The SS may assume that the packet generation will happen at time intervals equal to $\Delta_i$, for i=1,2,...,N, from the generation time of the previous packet. The example algorithm also may assume that the SS has already transmitted the parameters of the traffic model (e.g., $\Delta$, P, and S) to the BS. Therefore, the BS may know the value of the $i^{th}$ element in the inter-packet time matrix (e.g., $\Delta_i$). The transmission of these parameters may impose a negligible overhead since it may only be done once during a call time of a few minutes.

An example multi-tap scheduling algorithm may include two parts: request and grant. In some examples, the request part may be run in the SS while the grant part may be run in the BS, as discussed in greater detail below.

In the example method, the SS may communicate to the BS the index of the tap that the SS predicts will correspond to when the next packet will be ready for transmission. The SS may transmit information to the BS when the BS has allocated to the SS part of the UL subframe. Therefore, the SS may predict and piggyback the index in the packet.

An example request algorithm 500 is shown in FIG. 5. In cases where the SS is transmitting a packet to the BS, the SS may calculate the time difference between the last packet generation time and the current time. This time difference may be denoted as d. The SS may find the smallest $\Delta_i$ that is greater than or equal to d. Then, the SS may set index=i or sets index=N+1 if d>$\Delta_N$. The SS may then transmit the index to the BS, as discussed above with reference to FIG. 2.

In the example embodiment, this request algorithm 500 may be used for the prediction scenario. The SS may piggyback a separate BW request in the packet if the SS has traffic already queued in its buffer. Owing to the time sensitivity, the BS may allocate enough resources for this request as soon as possible.

In the example embodiment, the BS may reserve appropriate time slots from the available bandwidth based at least in part on the received index parameter and network constraints. Due to the trade off between the delay and bandwidth loss, the BS may select an operating point which may satisfy both delay and bandwidth constraints.

In some examples, one purpose of the example grant algorithm 600 shown in FIG. 6 may be to reserve enough bandwidth for the SS to transmit its traffic to the BS. In order to choose the time slot, the BS may use the parameters of the VoIP traffic model to determine the values of $R_{avg}$ and $\rho$. The index value may be sent from the SS to the BS as discussed above with reference to FIG. 2. The BS may calculate the next transmission time of the SS by applying the grant algorithm 600 to values of index and availability factor ρ. Intuitively, the BS may consider the availability factor, ρ, and the requested transmission time received from the SS via the index parameter. The BS may assign a transmission time at least $\Delta_{index}$ away from the previous packet transmission time and may notify the SS of the allocated BW via the UL MAP message. The extra delay in transmission might be imposed due to the lack of BW that may be translated to the small availability factor. In this algorithm, a smaller availability factor may result in longer delay.

As an example, using Equation (2) and the network parameters given above, the CDF matrix becomes C=[0.32,0.6, 0.85,0.95]. In this example, it is assumed that the SS has sent a message to the BS and indicated that index=1 and the BS has calculated ρ=0.5 for a VoIP user. By using the grant algorithm, the BS finds that the smallest i that satisfies $\rho \geq 1-c_i$ is i=2. Therefore, the BS calculates k=max(index,i)=2, and allocates an available time slot, which is at least $\Delta_2=17$ ms away from the previous packet transmission time, to the SS.

If the SS does not have any traffic to send in the allocated time slot, the BW may be "wasted." However, the SS may use this BW to send a new index calculated from the request algorithm to the BS. The BS may receive the new index from the SS and may process the new index to assign another BW in future UL subframes for the SS.

In example embodiments, the index may be piggybacked in a data packet or in a BW request message, and may comply with the IEEE 802.16 standard. More specifically, the index may be included in either the header or the body of transmitted packets. In example embodiments, both initial and subsequent index values may be transmitted in this manner.

The simulation results discussed below are based at least in part on the assumption that the subscriber stations generate VoIP traffic during the simulations. This is a rational assumption since many mobile WiMAX enabled handsets will use VoIP to make voice calls. In these simulations, the physical and MAC layers of a WiMAX network were simulated using the parameters shown in FIG. 7. As the purpose was to compare the performance of the uplink scheduling methods in the MAC layer of the WiMAX network, an ideal physical layer without any losses was assumed. Therefore, the results are considered the best achievable with respect to the MAC layer.

In the simulation results discussed below, two different values for the MAC layer frame length were chosen, and the average delay that individual packets experienced before transmission in the UL was observed. The BW loss was also measured. Simulations were conducted based at least in part on the UGS, rtPS, and multi-tap methods. For the UGS, scenarios in which either one, two, or three time-slots were allocated to the VoIP user in individual frames were considered. For the rtPS, scenarios in which the polling was done in either every or every other frame were considered. In some cases, decreasing the resource allocation or polling frequency results in higher delay. Nevertheless, it might result in saving some BW.

For the multi-tap model, different values of the availability factor (e.g., ρ) were considered. In some cases, increasing the number of users in the network decreases the maximum bandwidth that the BS can allocate to individual users, and it results in a smaller availability factor.

The operating points with average delays less than 20 ms are depicted in FIGS. 6 and 7. In some cases, reducing the average delay may result in more BW loss in UGS and multi-tap scheduling methods. In rtPS, BW loss and average delays are constant and are proportional to the frame length. As discussed above, in the rtPS method, the BS periodically communicates a message to the SS requesting the SS to identify the status of available traffic in the SS's queue. After receiving a reply message from the SS (e.g., BW-Req (bandwidth request) message in IEEE 802.16), the BS allocates an appropriate amount of BW for routing VoIP calls from the SS to the IP network. The BW loss in the rtPS algorithm is due to the polling overhead. For example, the BS has to allocate 6 bytes to the SS in the UL subframe whenever it wants to poll the SS about its queue size. In these simulations, it was assumed that the BS polled the SS once in every frame or every other frame. The former will achieve the minimum reachable average delay.

Figure 8:
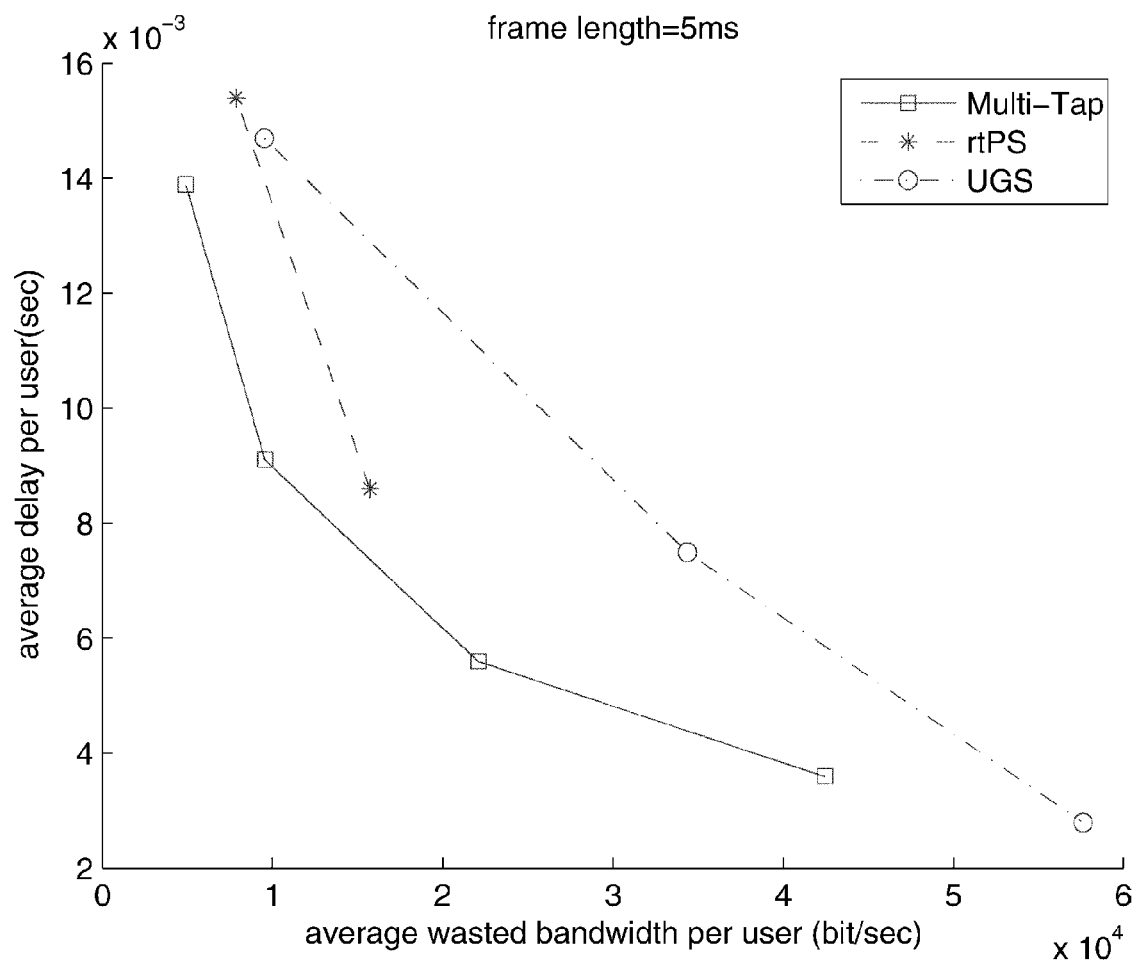
FIG. 8 is an example plot of delay versus wasted bandwidth corresponding to a frame length of 5 ms.
Figure 9:
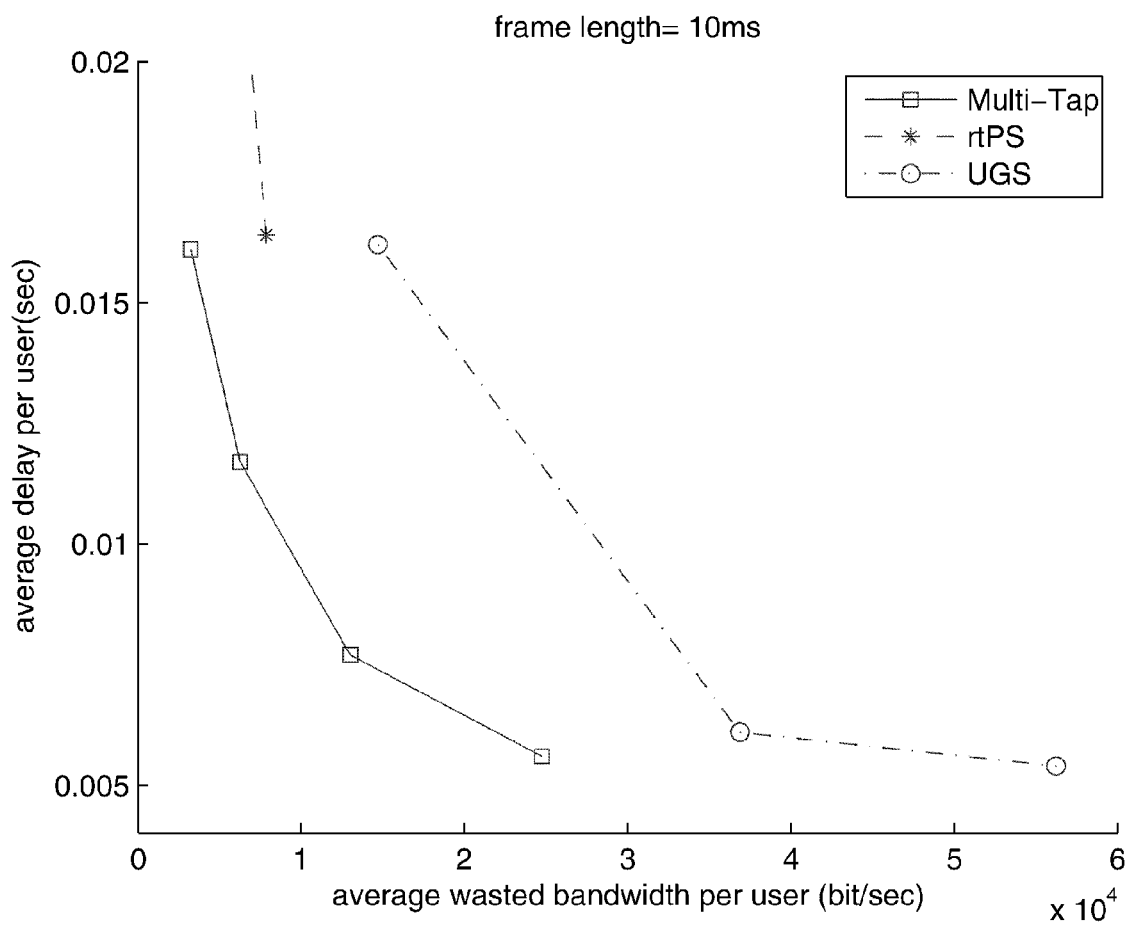
FIG. 9 is an example plot of delay versus wasted bandwidth corresponding to a frame length of 10 ms.

The performance of scheduling methods on traffic of a user with $R_{avg}=29$ Kbps was observed. As shown in FIGS. 8 and 9, rtPS did not reach an average delay less than almost 1.5 times the frame length. FIG. 8 is a plot of average delay per user versus average wasted bandwidth per user for a frame length of 5 ms. FIG. 9 is a plot of average delay per user versus average wasted bandwidth per user for a frame length of 10 ms. While it is possible to decrease the average delay in UGS by allocating more BW to the user, the waste of BW will increase. Further, the example multi-tap scheduling algorithm provides the improvements to performance with respect to the delay and BW loss. The average delay of the packets using the example multi-tap method decreases as a larger value for ρ is used by the BS. However, increasing ρ results in more waste of BW. By using the example multi-tap scheduling algorithm, the service provider can provide the VoIP SSs with less delay while they save more BW as compared to other scheduling methods. This may result in higher capacity and greater efficiency in networks.

Figure 10:
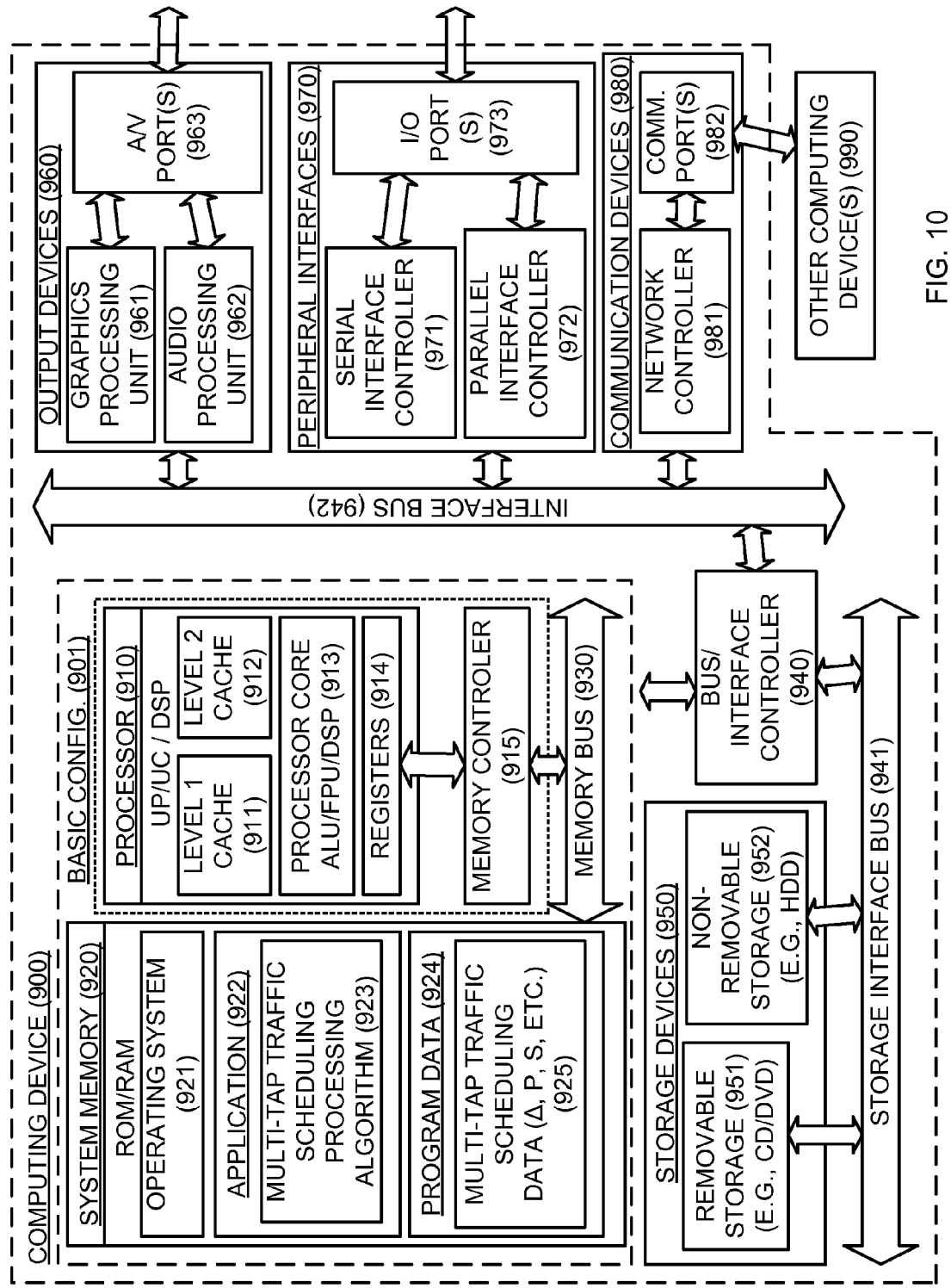
FIG. 10 is a block diagram illustrating an example computing device.

FIG. 10 is a block diagram illustrating an example computing device 900 that is arranged for traffic scheduling in accordance with the present disclosure. In a very basic configuration 901, computing device 900 typically includes one or more processors 910 and system memory 920. A memory bus 930 can be used for communicating between the processor 910 and the system memory 920.

Depending on the desired configuration, processor 910 can be of any type including but not limited to a microprocessor (μP), a microcontroller (μC), a digital signal processor (DSP), or any combination thereof. Processor 910 can include one more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 includes a multi-tap traffic scheduling processing algorithm 923 (such as a request algorithm and/or a grant algorithm as described herein) that is arranged to schedule packet traffic on a network. Program data 924 includes multi-tap traffic scheduling data 925 (such as inter-packet time(s), probability mass function(s), nominal packet size(s), index parameter(s), etc.) that is useful for scheduling packet traffic as described herein. In some embodiments, such as those depicted in FIGS. 11-13 and described herein, application 922 can be arranged to operate with program data 924 on an operating system 921 such that packet traffic over a network may be scheduled. This described basic configuration is illustrated in FIG. 10 by those components within dashed line 901.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output devices 960 include a graphics processing unit 961 and an audio processing unit 962, which can be configured to communicate to various external devices such as a display or speakers via one or more A/V ports 963. Example peripheral interfaces 970 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which can be arranged to facilitate communications with one or more other computing devices 990 over a network communication via one or more communication ports 982. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

FIG. 11 depicts an example method for a subscriber station to request allocated bandwidth from a base station such that the subscriber station is capable of communicating through the base station to a network using at least a portion of the allocated bandwidth. Action 201 includes collecting a plurality of inter-packet times for data transmitted from the subscriber station to the base station. Action 202 includes creating an inter-packet time matrix, $\Delta$, including the plurality of inter-packet times $\Delta_i$, where i is an integer between 1 and N. Action 204 includes creating a probability matrix, P, including a value $p_i$ of a probability mass function for two or more $\Delta_i$. Action 206 includes transmitting $\Delta$, P, and a nominal data packet size to the base station. Action 208 includes calculating a time difference, d, equal to a difference between a current time and a time when a previous data packet was generated. Action 210 includes, if d is less than or equal to $\neq 6_N$, setting an index parameter equal to an i associated with a smallest $\Delta_i$ which is equal to or greater than d, otherwise setting the index parameter equal to N+1. Action 212 includes transmitting the index parameter to the base station. Action 213 includes transmitting one or more packets of data between the subscriber station and the network using the allocated bandwidth, wherein the allocated bandwidth is associated with one or more of $\Delta$, P, and the index parameter.

Figure 12:
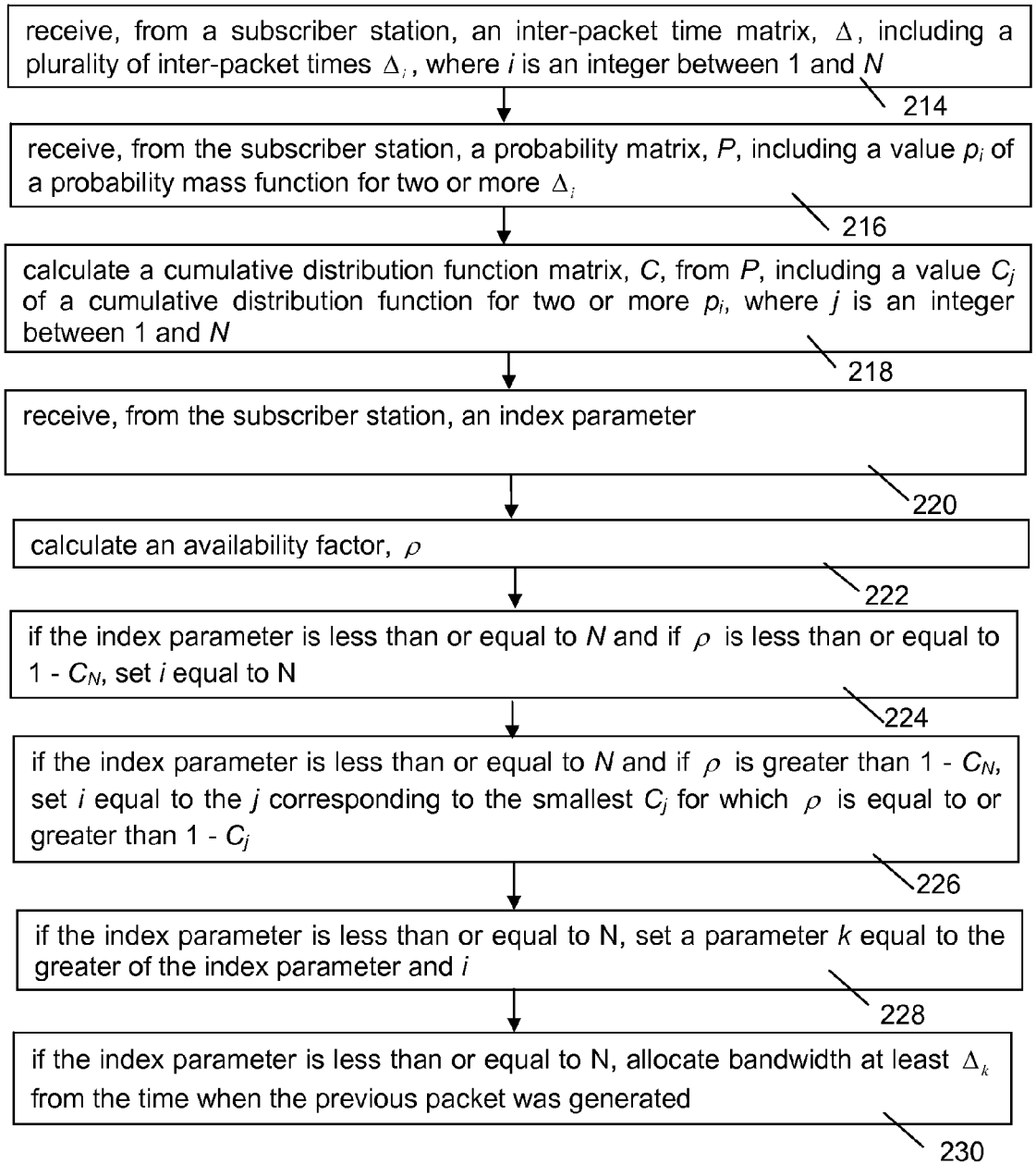
FIG. 12 is a flowchart showing the operation of an example embodiment.

FIG. 12 depicts example actions which may be performed by a base station in a wireless network configured to communicate with at least one subscriber station and configured to route communications between the subscriber station and a network. Action 214 includes receive, from a subscriber station, an inter-packet time matrix, $\Delta$, including a plurality of inter-packet times $\Delta_i$, where i is an integer between 1 and N. Action 216 includes receive, from the subscriber station, a probability matrix, P, including a value pi of a probability mass function for two or more $\Delta_i$. Action 218 includes calculate a cumulative distribution function matrix, C, from P, including a value $C_j$ of a cumulative distribution function for two or more $p_i$, where j is an integer between 1 and N. Action 220 includes receive, from the subscriber station, an index parameter. Action 222 includes calculate an availability factor, $\rho$. Action 224 includes, if the index parameter is less than or equal to N and if $\rho$ is less than or equal to $1-C_N$, set i equal to N. Action 226 includes, if the index parameter is less than or equal to N and if $\rho$ is greater than $1-C_N$, set i equal to the j corresponding to the smallest $C_j$ for which p is equal to or greater than $1-C_j$. Action 228 includes if the index parameter is less than or equal to N, set a parameter k equal to the greater of the index parameter and i. Action 230 includes, if the index parameter is less than or equal to N, allocate bandwidth at least $\Delta_k$ from the time when the previous packet was generated.

Figure 13:
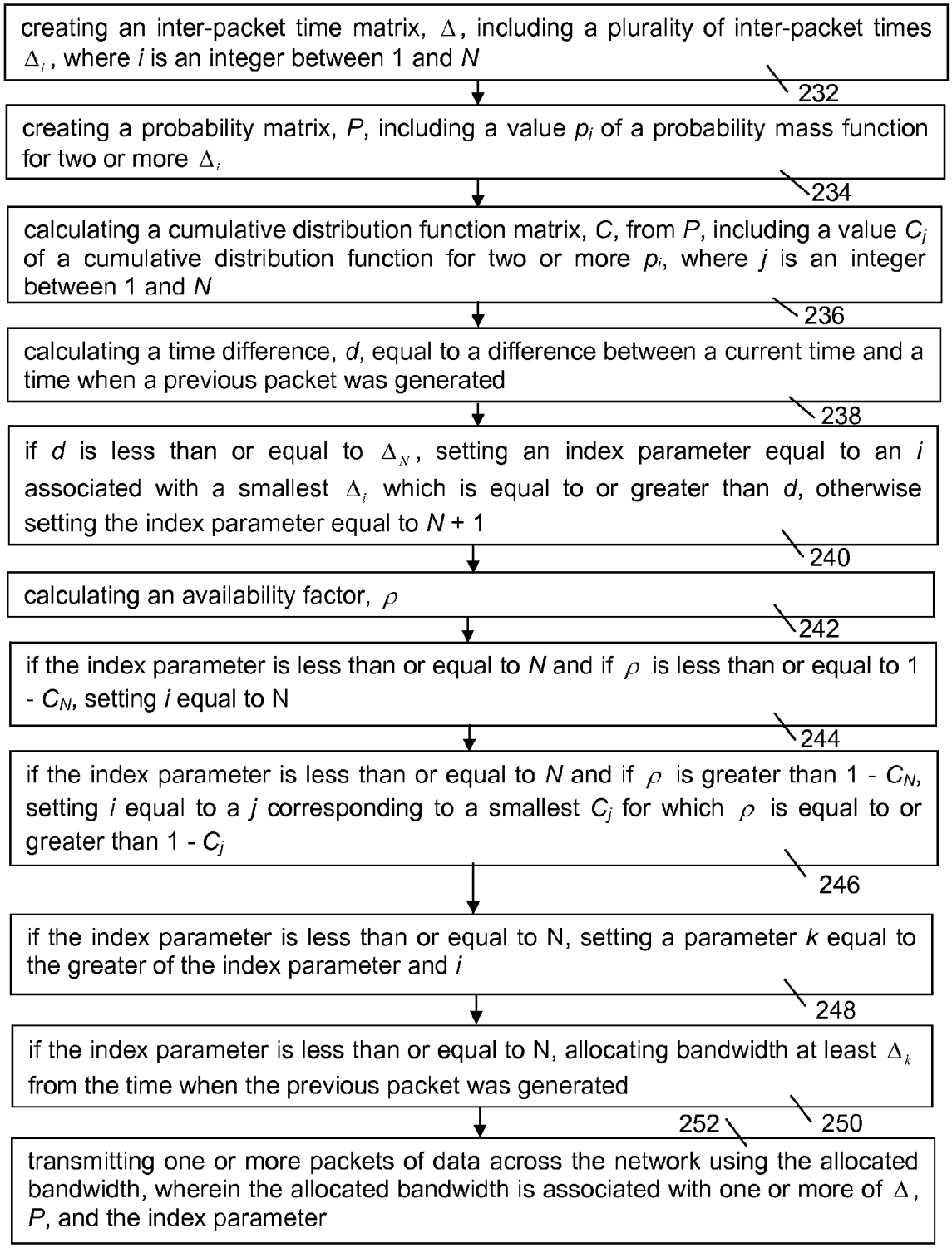
FIG. 13 is a flowchart showing the operation of an example embodiment, all arranged in accordance with the present disclosure.

FIG. 13 depicts an example method of transmitting data across a network. Action 232 includes creating an inter-packet time matrix, $\Delta$, including a plurality of inter-packet times $\Delta_i$, where i is an integer between 1 and N. Action 234 includes creating a probability matrix, P, including a value $p_i$ of a probability mass function for two or more $\Delta_i$. Action 236 includes calculating a cumulative distribution function matrix, C, from P, including a value $C_j$ of a cumulative distribution function for two or more $p_i$, where j is an integer between 1 and N. Action 238 includes calculating a time difference, d, equal to a difference between a current time and a time when a previous packet was generated. Action 240 includes, if d is less than or equal to $\Delta_N$, setting an index parameter equal to an i associated with a smallest $\Delta_i$ which is equal to or greater than d, otherwise setting the index parameter equal to N+1. Action 242 includes calculating an availability factor, $\rho$. Action 244 includes, if the index parameter is less than or equal to N and if $\rho$ is less than or equal to $1-C_N$, setting i equal to N. Action 246 includes, if the index parameter is less than or equal to N and if $\rho$ is greater than $1-C_N$, setting i equal to a j corresponding to a smallest $C_j$ for which $\rho$ is equal to or greater than $1-C_j$. Action 248 includes if the index parameter is less than or equal to N, setting a parameter k equal to the greater of the index parameter and i. Action 250 includes if the index parameter is less than or equal to N, allocating bandwidth at least $\Delta_k$ from the time when the previous packet was generated. Action 252 includes transmitting one or more packets of data across the network using the allocated bandwidth, wherein the allocated bandwidth is associated with one or more of $\Delta$, P, and the index parameter.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes"

should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for a subscriber station to request allocated bandwidth from a base station such that the subscriber station is capable of communicating through the base station to a network using at least a portion of the allocated bandwidth, the method for the subscriber station comprising:
    collecting a plurality of inter-packet times for data transmitted from the subscriber station to the base station;
    creating an inter-packet time matrix, $\Delta$, including the plurality of inter-packet times $\Delta_i$, where i is an integer between 1 and N;
    creating a probability matrix, P, including a value $p_i$ of a probability mass function for two or more $\Delta_i$;
    transmitting $\Delta$, P, and a nominal data packet size to the base station;
    calculating a time difference, d, equal to a difference between a current time and a time when a previous data packet was generated;
    if d is less than or equal to $\Delta_N$, setting an index parameter equal to an i associated with a smallest $\Delta_i$ which is equal to or greater than d, otherwise setting the index parameter equal to N+1;
    transmitting the index parameter to the base station; and
    transmitting one or more packets of data between the subscriber station and the network using the allocated bandwidth, wherein the allocated bandwidth is associated with one or more of $\Delta$, P, and the index parameter.

2. The method of claim 1, wherein the network is one of a wired network and a wireless network.

3. The method of claim 1, wherein transmitting the index parameter comprises transmitting the index parameter to the base station in at least one of a header associated with a data packet and a body associated with the data packet.

4. The method of claim 3, wherein the data packet comprises voice-over-Internet protocol data.

5. An apparatus comprising:
    a base station in a wireless network configured to communicate with at least one subscriber station and configured to route communications between the subscriber station and a network, where the base station is further configured to:
    receive, from a subscriber station, an inter-packet time matrix, $\Delta$, including a plurality of inter-packet times $\Delta_i$, where i is an integer between 1 and N;
    receive, from the subscriber station, a probability matrix, P, including a value $p_i$ of a probability mass function for two or more $\Delta_i$;
    calculate a cumulative distribution function matrix, C, from P, including a value $C_j$ of a cumulative distribution function for two or more $p_i$, where j is an integer between 1 and N;
    receive, from the subscriber station, an index parameter;
    calculate an availability factor, $\rho$;
    if the index parameter is less than or equal to N and if $\rho$ is less than or equal to $1-C_N$, set i equal to N;
    if the index parameter is less than or equal to N and if $\rho$ is greater than $1-C_N$, set i equal to the j corresponding to the smallest $C_j$ for which $\rho$ is equal to or greater than $1-C_j$;
    if the index parameter is less than or equal to N, set a parameter k equal to the greater of the index parameter and i; and
    if the index parameter is less than or equal to N, allocate bandwidth at least $\Delta_k$ from the time when the previous packet was generated.

6. The apparatus of claim 5, wherein the base station is configured to, if the index parameter is greater than N, allocate bandwidth at a next available time.

7. The apparatus of claim 6, wherein the availability factor, $\rho$, is equal to 1 minus a quotient of an average bitrate over a maximum bitrate.

8. The apparatus of claim 7, wherein the average bitrate is a quotient of a nominal bandwidth over an average inter-packet time; and wherein the average inter-packet time is based at least in part on sum of the products of $P_i \cdot \Delta_i$ for i of 1 to N.

9. The apparatus of claim 5, wherein the network is one of a wired network and a wireless network.

10. The apparatus of claim 5, wherein the $\Delta$ and the P are received within at least one of a header associated with a data packet and a body associated with the data packet.

11. The apparatus of claim 10, wherein the data packet comprises voice-over-Internet protocol data.

12. A method of transmitting data across a network, the method comprising:

creating an inter-packet time matrix, $\Delta$, including a plurality of inter-packet times $\Delta_i$, where i is an integer between 1 and N;

creating a probability matrix, P, including a value $p_i$ of a probability mass function for two or more $\Delta_i$;

calculating a cumulative distribution function matrix, C, from P, including a value $C_j$ of a cumulative distribution function for two or more $p_i$, where j is an integer between 1 and N;

calculating a time difference, d, equal to a difference between a current time and a time when a previous packet was generated;

if d is less than or equal to $\Delta_N$, setting an index parameter equal to an i associated with a smallest $\Delta_i$ which is equal to or greater than d, otherwise setting the index parameter equal to N+1;

calculating an availability factor, $\rho$;

if the index parameter is less than or equal to N and if $\rho$ is less than or equal to $1-C_N$, setting i equal to N;

if the index parameter is less than or equal to N and if $\rho$ is greater than $1-C_N$, setting i equal to a j corresponding to a smallest $C_j$ for which $\rho$ is equal to or greater than $1-C_j$;

if the index parameter is less than or equal to N, setting a parameter k equal to the greater of the index parameter and i;

if the index parameter is less than or equal to N, allocating bandwidth at least $\Delta_k$ from the time when the previous packet was generated; and transmitting one or more packets of data across the network using the allocated bandwidth, wherein the allocated bandwidth is associated with one or more of $\Delta$, P, and the index parameter.

13. The method of claim 12, wherein the allocated bandwidth is equal to a nominal bandwidth.

14. The method of claim 12, further comprising, if the index parameter is greater than N, allocating bandwidth at a next available time.

15. The method of claim 14, wherein the allocated bandwidth is equal to a nominal bandwidth.

16. The method of claim 12, wherein the availability factor, $\rho$, is equal to 1 minus the quotient of an average bitrate over a maximum bitrate.

17. The method of claim 16, wherein the average bitrate is the quotient of a nominal bandwidth over an average inter-packet time; and wherein the average inter-packet time is defined as the sum of the products of $P_i \cdot \Delta_i$ for i of 1 to N.

18. The method of claim 17, wherein the maximum bitrate is determined based at least in part on at least one of a service level agreement and a current network status.

19. The method of claim 12, wherein the network is a wireless network.

20. The method of claim 19, wherein the wireless network comprises at least one subscriber station and at least one base station.

21. The method of claim 20, wherein said calculating the time difference and said setting the index parameter are performed by the subscriber station; and wherein said calculating the availability factor and said allocating bandwidth are performed by the base station.

22. The method of claim 12, wherein the data packet comprises voice-over-Internet protocol data.

\* \* \* \* \*

UNITED STATES PATENT AND TRADEMARK OFFICE
CERTIFICATE OF CORRECTION

PATENT NO. : 8,159,952 B2
APPLICATION NO. : 12/368516
DATED : April 17, 2012
INVENTOR(S) : Ansari et al.

It is certified that error appears in the above-identified patent and that said Letters Patent is hereby corrected as shown below:

On the Title Page, in Item (56), under "OTHER PUBLICATIONS", in Column 2, Line 2, delete "rendamoness" and insert -- randomness --, therefor.

On the Title Page, in Item (56), under "OTHER PUBLICATIONS", in Column 2, Line 5, delete "sevices" and insert -- services --, therefor.

On the Title Page, in Item (56), under "OTHER PUBLICATIONS", in Column 2, Line 11, delete "protocol, "IEEE" and insert -- protocol," IEEE --, therefor.

On the Title Page, in Item (56), under "OTHER PUBLICATIONS", in Column 2, Line 23, delete "VViMax" and insert -- WiMax --, therefor.

On the Title Page, in Item (56), under "OTHER PUBLICATIONS", in Column 2, Line 23, delete "AdvancedNetworking" and insert -- Advanced Networking --, therefor.

On the Title Page, in the Figure, delete "[figure]" and insert -- [figure] --, therefor.

Signed and Sealed this
Twenty-fourth Day of June, 2014

Michelle K. Lee
*Deputy Director of the United States Patent and Trademark Office*

CERTIFICATE OF CORRECTION (continued)
U.S. Pat. No. 8,159,952 B2

On the Title Page, in the Figure, delete " 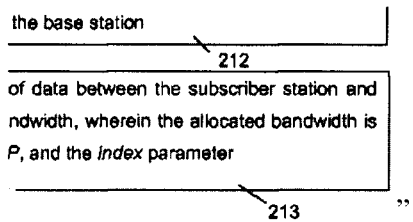 "

and insert -- 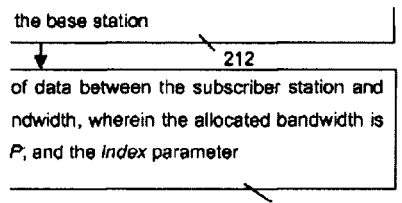 --, therefor.

In the Drawings

In Fig. 2, Sheet 2 of 13, delete "(REQUEST AND GRANT SEQUENCE IREPEATED" and insert -- (REQUEST AND GRANT SEQUENCE REPEATED --, therefor.

In Fig. 10, Sheet 10 of 13, in Box "(915)", in Line 1, delete "CONTROLER" and insert -- CONTROLLER --, therefor.

In Fig. 11, Sheet 11 of 13, delete " 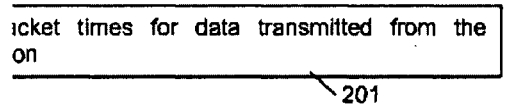 "

and insert -- 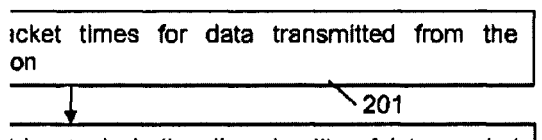 --, therefor.

In Fig. 11, Sheet 11 of 13, delete " 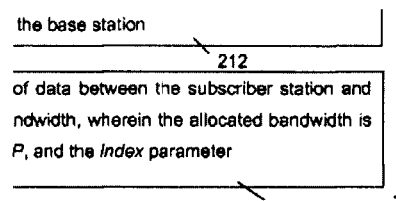 "

and insert -- 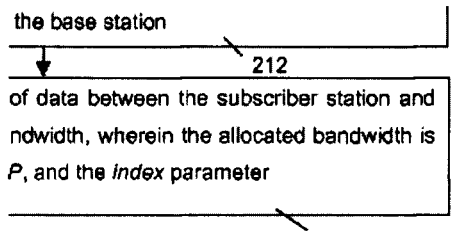 --, therefor.

CERTIFICATE OF CORRECTION (continued)
U.S. Pat. No. 8,159,952 B2

In the Specification

In Column 5, Line 31, delete "the a" and insert -- the --, therefor.

In Column 5, Line 49, delete "Δ," and insert -- $\Delta_i$ --, therefor.

In Column 5, Line 54, delete "A," and insert -- Δ, --, therefor.

In Column 5, Line 59, delete ",pN]" and insert -- ,pN]. --, therefor.

In Column 5, Lines 59-65, delete "N may represent ........... (P, Δ, S)." and insert the same at Line 60, as a new paragraph.

In Column 12, Line 24, delete "≢6$_N$," and insert -- $\Delta_N$, --, therefor.

In Column 12, Line 40, delete "pi" and insert -- $p_i$ --, therefor.

In Column 12, Line 51, delete "p" and insert -- ρ --, therefor.